United States Patent
Awad et al.

(10) Patent No.: US 12,065,532 B2
(45) Date of Patent: Aug. 20, 2024

(54) WATER-DISPERSIBLE POLYURETHANE (METH)ACRYLATES FOR ACTINIC RADIATION CURABLE COATINGS

(71) Applicant: MIWON AUSTRIA FORSCHUNG UND ENTWICKLUNG GMBH, Grambach (AT)

(72) Inventors: Rami Awad, Graz (AT); Paul-Lukas Awad, Graz (AT)

(73) Assignee: MIWON AUSTRIA FORSCHUNG UND ENTWICKLUNG GMBH, Grambach (AT)

( * ) Notice: Subject to any disclaimer, the term of this patent is extended or adjusted under 35 U.S.C. 154(b) by 683 days.

(21) Appl. No.: 17/260,136

(22) PCT Filed: Jul. 15, 2019

(86) PCT No.: PCT/EP2019/069041
§ 371 (c)(1),
(2) Date: Jan. 13, 2021

(87) PCT Pub. No.: WO2020/012039
PCT Pub. Date: Jan. 16, 2020

(65) Prior Publication Data
US 2021/0292466 A1    Sep. 23, 2021

(30) Foreign Application Priority Data

Jul. 13, 2018  (EP) ..................................... 18183459

(51) Int. Cl.
| | |
|---|---|
| *C09D 175/16* | (2006.01) |
| *C08G 18/08* | (2006.01) |
| *C08G 18/12* | (2006.01) |
| *C08G 18/22* | (2006.01) |
| *C08G 18/32* | (2006.01) |
| *C08G 18/34* | (2006.01) |
| *C08G 18/38* | (2006.01) |
| *C08G 18/67* | (2006.01) |
| *C08G 18/80* | (2006.01) |
| *C09D 175/04* | (2006.01) |
| *C09D 175/06* | (2006.01) |

(52) U.S. Cl.
CPC ....... *C08G 18/673* (2013.01); *C08G 18/0823* (2013.01); *C08G 18/12* (2013.01); *C08G 18/22* (2013.01); *C08G 18/227* (2013.01); *C08G 18/32* (2013.01); *C08G 18/3206* (2013.01); *C08G 18/3212* (2013.01); *C08G 18/348* (2013.01); *C08G 18/38* (2013.01); *C08G 18/3853* (2013.01); *C08G 18/8025* (2013.01); *C09D 175/04* (2013.01); *C09D 175/06* (2013.01); *C09D 175/16* (2013.01); *C08G 2150/00* (2013.01)

(58) Field of Classification Search
CPC .. C09D 175/16; C09D 175/06; C09D 175/04; C08G 18/32; C08G 18/38; C08G 18/22; C08G 18/34
See application file for complete search history.

(56) References Cited

U.S. PATENT DOCUMENTS

| | | |
|---|---|---|
| 4,596,678 A | 6/1986 | Merger et al. |
| 4,596,679 A | 6/1986 | Hellbach et al. |
| 5,087,739 A | 2/1992 | Bohmholdt et al. |
| 5,684,081 A | 11/1997 | Dannhorn et al. |
| 2010/0222448 A1 | 9/2010 | Ziegler et al. |
| 2013/0041072 A1* | 2/2013 | Sommer ................ C08G 18/68 523/415 |

FOREIGN PATENT DOCUMENTS

| | | |
|---|---|---|
| CN | 106854432 A | 6/2017 |
| DE | 2936039 A1 | 4/1981 |
| DE | 19618720 A1 | 11/1996 |

(Continued)

OTHER PUBLICATIONS

International Preliminary Report on Patentability received for PCT Patent Application No. PCT/EP2019/069041, mailed on Jan. 28, 2021, 8 pages.

(Continued)

*Primary Examiner* — Michael L Leonard
(74) *Attorney, Agent, or Firm* — Faegre Drinker Biddle & Reath LLP

(57) ABSTRACT

The invention relates to a water-dispersible polyurethane (meth)acrylate U substantially synthesised from at least one multifunctional aromatic or (cyclo)aliphatic isocyanate I, at least one (cyclo)aliphatic diol H2 having a number of carbon atoms of from two to twenty, at least one (cyclo)aliphatic triol H3 having a number of carbon atoms of from three to twenty, an aliphatic hydroxyacid A having at least two carbon atoms, at least one hydroxyl group, and at least one acid group which may be a carboxyl group, a sulfonic acid group, or a phosphoric or phosphonic acid group, and at least one component R having at least one isocyanate-reactive group and at least one radically polymerisable olefinically unsaturated group, at least one base B for at least partial neutralisation of the acid groups of component A, and a catalyst C for urethane formation which is a salt or a chelate complex of a metal of any of groups 3 to 15 of the Periodic System of the Elements, to a process for its preparation, and to the use thereof for coating substrates.

13 Claims, No Drawings

(56) References Cited

FOREIGN PATENT DOCUMENTS

| DE | 19525489 A1 | 1/1997 |
|---|---|---|
| DE | 19810793 A1 | 9/1999 |
| DE | 19826712 A1 | 12/1999 |
| DE | 19913353 A1 | 9/2000 |
| DE | 19933012 A1 | 1/2001 |
| DE | 19957604 A1 | 5/2001 |
| DE | 19957900 A1 | 6/2001 |
| DE | 102010003308 A1 | 1/2011 |
| EP | 0007508 A2 | 2/1980 |
| EP | 0057474 A2 | 8/1982 |
| EP | 0098752 A2 | 1/1984 |
| EP | 0126299 A1 | 11/1984 |
| EP | 0126300 A1 | 11/1984 |
| EP | 0355443 A2 | 2/1990 |
| EP | 0495751 A1 | 7/1992 |
| EP | 0615980 A2 | 9/1994 |
| EP | 0694531 A2 | 1/1996 |
| EP | 1591502 A1 | 11/2005 |
| EP | 2316867 A1 | 5/2011 |
| EP | 2546300 A1 | 1/2013 |
| WO | 98/33761 A1 | 8/1998 |
| WO | 03/35596 | 5/2003 |
| WO | 2004/029121 A1 | 4/2004 |
| WO | 2004/076519 A1 | 9/2004 |
| WO | 2004/076520 A1 | 9/2004 |
| WO | 2010/063612 A1 | 6/2010 |

OTHER PUBLICATIONS

International Search Report and Written Opinion received for PCT Patent Application No. PCT/EP2019/069041, mailed on Nov. 12, 2019, 9 pages.

* cited by examiner

WATER-DISPERSIBLE POLYURETHANE (METH)ACRYLATES FOR ACTINIC RADIATION CURABLE COATINGS

CROSS REFERENCE TO RELATED APPLICATIONS

This application is a U.S. National Phase Application under 35 U.S.C. § 371 of International Application No. PCT/EP2019/069041, filed on Jul. 15, 2019, which claims the benefit of and priority to European Patent Application No. 18183459.9, filed on Jul. 13, 2018, the contents of which are incorporated herein in their entirety.

FIELD OF THE INVENTION

The present invention relates to water-dispersible polyurethane (meth)acrylates for actinic radiation curable coatings, to their use in preparation of actinic radiation curable coatings, and to a process for their production.

BACKGROUND OF THE INVENTION

Polyurethane (meth)acrylates which are dispersible in water have already been known from, for example, EP 0 098 752 A2 and DE 29 36 039 A1. The hydrophilicity of these known systems is due to the presence of ionic centres, more particularly of carboxylate groups or sulfonate groups, which have alkali metal cations or ammonium ions as their counterions. The amines that are often present, for the purpose of neutralisation of the carboxylic acid groups or sulfonic acid groups in anionically stabilised oligomeric or polymeric urethanes or of increase in molar mass by reaction of multifunctional amines with the isocyanate-functional prepolymer, may bring about yellowing of the varnishes. The desired increase in molar mass, however, has been deemed to be necessary in order to lower the stickiness of the films produced from these polyurethane (meth)acrylates, after flash-off and prior to curing by actinic radiation. "Actinic radiation" or "radiation" as used herein refers to UV light, and also to electron beams or other high energy particle beams.

Further radiation-curable, water-emulsifiable polyurethane (meth)acrylates have been known, for example, from EP 0 694 531 A2, DE 195 25 489 A1, DE 198 10 793 A1, DE 199 33 012 A1, DE 199 57 604 A1, and EP 1 591 502 A1. For all of the products obtainable according to the mentioned documents, a common feature is that the production of the polyurethane (meth)acrylates described therein comprises reaction with at least one diamine or polyamine.

In DE 10 2010 003 308 A1, water-emulsifiable urethane (meth)acrylates are described where in the synthesis of these, addition of amines leading to chain extension of the polymer is omitted in order to reduce yellowing. A disadvantage of these systems is that instead, addition of a hydroxyfunctional polyester having a mass-average molar mass of from 700 g/mol to 2 kg/mol, and of a hydroxyfunctional epoxyacrylate is mandatory, as polyesters are prone to hydrolysis in an aqueous system.

OBJECT OF THE INVENTION

It was an object of the present invention to develop radiation-curable, water-soluble or water-dispersible polyurethane (meth)acrylates which do not suffer from yellowing, which are free from bisphenol A (BPA) and from oligomeric or polymeric products derived there-from, from alkylphenol ethoxylate-based emulsifier (APEO), and also free from tin-based catalysts, and do not need addition of further adjuvants such as hydroxyfunctional polymers, or multifunctional amines. The expression "multifunctional" molecule means, in the context of this invention, a molecule having at least two of the functionalities under consideration. The expression "(meth)acrylate" stands for "methacrylate and/or acrylate", in the context of this invention.

This object has been achieved by providing a polyurethane (meth)acrylate U which is synthesised from the following essential ingredients: at least one multifunctional isocyanate I which is selected from the group consisting of multifunctional aromatic and (cyclo)aliphatic isocyanates, at least one (cyclo)aliphatic diol H2 having a number of carbon atoms of from two to twenty, at least one triol H3 selected from the group consisting of (cyclo)aliphatic triols and heterocylic triols, having a number of carbon atoms of from three to twenty, an aliphatic hydroxyacid A having at least two carbon atoms, at least one hydroxyl group, and at least one acid group which is selected from the group consisting of a carboxyl group, a sulfonic acid group, or a phosphoric or phosphonic acid group, and at least one component R having at least one isocyanate-reactive group and at least one radically polymerisable olefinically unsaturated group, at least one base B for at least partial neutralisation of the acid groups of component A, and a catalyst C for urethane formation which is a salt or a chelate complex of a metal of any of groups 3 to 15 of the Periodic System of the Elements, in accordance with the current IUPAC nomenclature as of 2016-11-28. By "multifunctional" isocyanates are meant di- and/or poly-isocyanates having two, or more than two, isocyanate groups per molecule. By "(cyclo)aliphatic compounds", either or both of cycloaliphatic compounds and aliphatic compounds are meant.

The invention also relates to a process for manufacturing the polyurethane (meth)acrylate U preferably in a multi-step process comprising the steps of a) preparation of a prepolymer P1 by reacting, optionally in the presence of an inert solvent S, at least one (cyclo)aliphatic diol H2 having a number of carbon atoms of from two to twenty, at least one triol H3 selected from the group consisting of (cyclo)aliphatic triols and heterocyclic triols having a number of carbon atoms of from three to twenty, with a multifunctional isocyanate I which is selected from the group consisting of multifunctional aromatic and (cyclo)-aliphatic isocyanates, preferably in the presence of a catalyst C as defined supra, to achieve a mass fraction $w_{NCO}$ of isocyanate groups (having a molar mass of 42.017 g/mol) based on the sum of the masses of components H2, H3, and I in the reaction mixture, of from 4.5% to 8.5%, b) addition to the prepolymer P1 of step a), optionally in the presence of an inert solvent S, of at least one component R which is an organic compound having at least one isocyanate-reactive group and at least one radically polymerisable unsaturated group in its molecule, in a mass adequate to lower the mass fraction $w_{NCO}$ of isocyanate groups based on the sum of the masses of components H2, H3, I and R in the reaction mixture, to from 0.6% to 3.6%, to make a second prepolymer P2 by reaction of the named constituents, c) addition to the prepolymer P2 of step b), optionally in the presence of an inert solvent S, of an aliphatic hydroxyacid A having at least two carbon atoms, at least one hydroxyl group, and at least one acid group which may be a carboxyl group, a sulfonic acid group, or a phosphoric or phosphonic acid group, in a mass adequate to lower the mass fraction $w_{NCO}$ of isocyanate groups based on the mass of components H2, H3, I, R and A in the reaction mixture, to from 0.0% to 0.05%, to make a polymer P3, d) adding to the product of step c), a basic compound selected from the group consisting of alkali hydroxides, earth alkali hydroxides, ammonia, ammonium hydroxide solutions, organic amines, and organic ammonium hydroxides, preferably, sodium hydroxide, potassium hydroxide, or lithium hydroxide, each preferably in the form of their aqueous solution or dissolved in other inorganic or organic solvents S', most preferred acetone or methyl isobutyl ketone, or mixtures of two or more of these basic compounds, to the polymer P3, in a mass adequate to neutralise preferably from 40% to 95% of the acid groups introduced by the aliphatic hydroxyacid A into the polymer P3 made in the reaction step c), wherein the solvent S' employed has to be selected so that it will not interfere with the intended reactions, e) optionally removing the inert solvent S or the solvent S', which may be the same, or may be different, used in steps a), b), c) and d), preferably by distillation, and f) dispersing the product of step d) or the residue of step e) in water to obtain an aqueous dispersion of a polyurethane (meth)acrylate U having a mass fraction of solids of preferably from 35% to 55%, and a dynamic viscosity, measured at 23° C. and a shear rate of 25 s$^{-1}$ in a cone and plate viscosimeter, of preferably from 50 mPa·s to 1000 mPa·s, particularly preferably of 300 mPa·s to 800 mPa·s.

An isocyanate-reactive group is, in the context of this invention, a group having a —OH, —NH, or —SH hydrogen atom which forms a bond in an addition reaction with an isocyanate-functional molecule to form a urethane or carbamate, a urea, or a thiocarbamate.

It has been found, in the course of making the experiments that have led to the present invention, that the coating compositions according to the present invention form coherent and even coating layers on substrates by physical drying, i. e, before subjecting them to actinic cure, even without the chain extension step which is usually performed by adding multifunctional amines, or without adding hydroxyfunctional polymers in the reaction with the multifunctional isocyanates to increase the strength and hardness of the coating films formed after drying.

DETAILED DESCRIPTION OF THE PREFERRED EMBODIMENTS

The aqueous dispersions of the polyurethane (meth)acrylates U are optionally mixed with at least one low molar mass (meth)acrylate M which has at least two, preferably at least three, (meth)acrylate functions per molecule, and a number average molar mass of up to 1000 g/mol.

Such a mixture of U and M preferably has a specific unsaturation, measured as the ratio $n(MA)/m_{UM}$ of the amount of substance n(MA) of (meth)acrylate functional groups and the sum $m_{UM}$ of the masses mu and mM of components U and M, of at least 1 mol/kg, preferably, at least 1.5 mol/kg, and particularly preferred, at least 2.0 mol/kg. The mass mu is the mass of the dispersed polyurethane (meth)acrylates U, i. e. not including the aqueous phase of the dispersion or any further added components such as biocides or additional emulsifiers.

The above-described aqueous dispersions of polyurethane (meth)acrylates U and mixtures thereof with M can be used with particular advantage as materials for coating wood and wood-containing substrates.

The following starting materials, or educts, are preferably used in the synthesis of the urethane (meth)acrylates U:

Component I comprises at least one, preferably one to four, more preferably one to three aromatic or (cyclo) aliphatic diisocyanates I2 and/or polyisocyanates IP, collectively also referred to as "isocyanates". Aliphatic and cycloaliphatic isocyanates are preferred. A diisocyanate I2 is a molecule having two isocyanate groups, and a polyisocyanate IP, also more correctly referred to as polyfunctional isocyanate, is a molecule having more than two isocyanate groups, in the context of this invention. The term "multifunctional isocyanate" stands for any one of difunctional and polyfunctional isocyanates, or a mixture of both. The polyisocyanates IP of this invention are preferably oligomers of aromatic, aliphatic or cycloaliphatic diisocyanates I2. The isocyanate (NCO) functionality of such a compound, which is the average number of functional groups —NCO in an isocyanate molecule, is generally at least 1.8 and may be up to 8, preferably from 1.8 to 5, and more preferably from 2 to 4. The mass fraction $w_{NCO}$ of isocyanate groups in component I, defined as $w_{NCO}=m_{NCO}/m_I$, where $m_I$ is the mass of the component I, calculated using the molar mass of the isocyanate group $M_{NCO}=42.017$ g/mol, is generally from 0.05 kg/kg to 0.25 kg/kg (from 5% to 25%). Similarly, the mass fraction $w_{NCO}$ of isocyanate groups in the reaction mixture is defined as $w_{NCO}=m_{NCO}/m_{RM}$, where $m_{RM}$ is the mass of the reaction mixture, calculated using the molar mass of the isocyanate group $M_{NCO}=42.017$ g/mol. Therefore, the mass $m_{NCO}$ of isocyanate groups is $m_{NCO}=n_{NCO} \cdot N_{CO}$, where $n_{NCO}$ is the amount of substance of isocyanate groups in the compound or mixture of compounds under consideration.

The diisocyanates I2 are preferably isocyanates having from four to twenty carbon atoms. Examples of typical diisocyanates are aromatic diisocyanates such as toluene diisocyanate (mixture of 2,4- and 2,6-isomers, "TDI"), and 4,4'-methylene diphenyl diisocyanate (1,1'-methylenebis(4-isocyanatobenzene), "MDI"), aliphatic diisocyanates such as tetramethylene diisocyanate (1,4-diisocyanatobutane), pentamethylene diisocyanate (1,5-diisocyanato-pentane), hexamethylene diisocyanate (1,6-diisocyanatohexane), octamethylene diisocyanate, decamethylene diisocyanate, dodecamethylene diisocyanate, tetradecamethylene diisocyanate, derivatives of lysine diisocyanate, trimethylhexane diisocyanate or tetra-methylhexane diisocyanate, cycloaliphatic diisocyanates such as 1,4-, 1,3-, or 1,2-diiso-cyanatocyclohexane, 4,4'- or 2,4'-di(isocyanatocyclohexyl)methane ("H12MDI"), 1-isocyanato-3,3,5-trimethyl-5-(isocyanatomethyl)cyclohexane ("IPDI", isophorone diisocyanate), 1,3- or 1,4-bis(isocyanatomethyl)cyclohexane or 2,4-, or 2,6-diisocyanato-1-methylcyclohexane, and also 3 (or 4), 8 (or 9)-bis(isocyanatomethyl)-tricyclo [5.2.1.0$^{2.6}$]decane isomer mixtures. Mixtures of the said diisocyanates, or oligomers formed from these multifunctional iso-cyanates may also be used.

Preference is given to aliphatic or cycloaliphatic multifunctional isocyanates I, particular preference for the class of linear and monocyclic isocyanates is given to hexamethylene diisocyanate, 1,3-bis(isocyanatomethyl)-cyclohexane, isophorone diisocyanate, and 4,4'- or 2,4'-di(isocyanatocyclohexyl)-methane, and very particular preference is given to 1,3-bis(isocyanatomethyl)-cyclohexane, isophorone diisocyanate and hexamethylene diisocyanate. Isophorone diisocyanate is usually in the form of a mixture, specifically a mixture of the cis- and trans-isomers, generally in a mass ratio of about 60:40 to 80:20, preferably in a mass ratio of about 70:30 to 75:25, and more preferably in a mass ratio of about 75:25. Among the polycyclic aliphatic isocyanates, dicyclohexylmethane-4,4'-diisocyanate is preferred which may likewise be in the form of a mixture of the different cis- and trans-isomers. Cycloaliphatic isocyanates are those which comprise at least one cycloaliphatic ring system. Aliphatic isocyanates are those which comprise exclusively linear or branched chains, in other words acyclic compounds.

Also contemplated are higher multifunctional isocyanates I, having on average more than two isocyanate groups per molecule. Suitable examples include triisocyanates such as triisocyanatononane or 1,3,5-triisocyanato2-methylbenzene, or cyclic trimers of diisocyanates which have an isocyanurate cyclic structure, such as isophoronediisocyanate trimer and hexamethylenediisocyanate trimer, or those isophoronediisocyanate and hexamethylene-diisocyanate trimers which have an asymmetric trimeric structure derived from a cyclic iminooxadiazinedione.

Suitable multifunctional isocyanates I also include polyisocyanates containing isocyanurate groups, uretdione diisocyanates, polyisocyanates containing biuret groups, polyisocyanates containing urethane groups or allophanate groups, polyisocyanates comprising oxadiazine-trione groups, uretonimine-modified polyisocyanates, carbodiimide, hyper-branched polyisocyanates, polyurethane-polyisocyanate prepolymers or polyurea-poly-isocyanate prepolymers of linear or branched $C_4$- to $C_{20}$-alkylene diisocyanates, and of cycloaliphatic diisocyanates having from six to twenty carbon atoms. The di- and polyisocyanates I which can be used preferably have a mass fraction of isocyanate groups $w_{NCO}$ (calculated as NCO, molar mass 42.017 g/mol) of from 10% to 60%, based on the mass of the di- and poly-isocyanate (mixture), preferably from 15% to 60%, and more preferably from 20% to 55%. Preference is given to aliphatic and/or cycloaliphatic di- and polyisocyanates, collectively referred to hereinafter as (cyclo)aliphatic for the purposes of this specification, examples being the aliphatic and/or cycloaliphatic diisocyanates stated above, or mixtures thereof. For the present invention it is possible to use not only those di- and polyisocyanates obtained by phosgenating the corresponding amines but also those prepared without the use of phosgene, i.e., by phosgene-free processes. According to EP 0 126 299 A1, corresponding to U.S. Pat. No. 4,596,678, EP 0 126 300 A1, corresponding to U.S. Pat. No. 4,596,679, and EP 0 355 443 A2, corresponding to U.S. Pat. No. 5,087,739, for example, (cyclo)aliphatic diisocyanates, such as hexamethylene 1,6-diisocyanate (HDI), isomeric aliphatic diiso-cyanates having six carbon atoms in the alkylene radical, 4,4'- or 2,4'-di(isocyanato-cyclohexyl)methane, and 1-isocyanato-3-isocyanatomethyl-3,5,5-trimethyl-cyclohexane (isophorone diisocyanate or IPDI), for example, can be prepared by reacting the (cyclo) aliphatic diamines with, for example, urea and alcohols to give (cyclo)aliphatic biscarbamic esters and subjecting said esters to thermal cleavage into the corresponding diisocyanates and alcohols. The synthesis takes place usually continuously in a circulation process and in the presence, optionally, of N-unsubstituted carbamic esters, dialkyl carbonates, and other by-products recycled from the reaction process. Di- or polyisocyanates I obtained in this way generally contain a very low or even unmeasurable fraction of chlorinated compounds, leading to favourable colour numbers in the products.

In one embodiment of the present invention the di- and polyisocyanates I have a total hydrolysable chlorine content of less than 200 mg/kg, preferably of less than 120 mg/kg, more preferably less than 80 mg/kg, very preferably less than 50 mg/kg, in particular less than 15 mg/kg, and especially less than 10 mg/kg. This can be measured by means, for example, of ASTM specification D4663-98. Of course, though, di- and polyisocyanates I having a higher chlorine content can also be used.

Component H2 has, on average, more than one, and less than three, and preferably, two hydroxyl groups per molecule, and comprises at least one, preferably one to three, more preferably one to two, and very preferably precisely one hydroxyfunctional (cyclo)aliphatic compound, having a molar mass of less than 700 g/mol, preferably less than 600 g/mol, more preferably less than 500 g/mol, and very preferably less than 400 g/mol. A cycloaliphatic diol is diol which comprises at least one saturated ring system. Examples of cycloaliphatic diols are 1,2- and 1,3-cyclopentanediols, 1,2-, 1,3-, and 1,4-cyclohexanediols, 1,1-, 1,2-, 1,3-, and 1,4-bis(hydroxymethyl)cyclohexanes, 1,1-, 1,2-, 1,3-, and 1,4-bis(hydroxy-ethyl)cyclohexanes, bis(4-hydroxy-cyclohexane)-isopropylidene, and the isomer mixture of 3(4),8(9)-dihydroxymethyltricyclo-(5.2.1.0$^{2.6}$)decane. Preference is given to 1,3- and 1,4-bis-(hydroxymethyl) cyclohexane, bis(4-hydroxycyclohexane)isopropylidene, and the isomer mixture of 3(4),8(9)-dihydroxymethyl-tricyclo(5.2.1.0$^{2.6}$)decane ("TCD-DM"), and mixtures of these. An aliphatic diol is a diol which has a linear or branched aliphatic chain. Useful diols are the linear diols having preferably from two to ten carbon atoms, such as ethylene glycol, 1,2- and 1,3-propanediol, 1,2-, 1,3-, 1,4- and 2,3-butanediol, 1,5-pentanediol, 1,6-hexanediol, 1,8-octanediol, and 1.10-decanediol, ether diols such as diethyleneglycol and dipropylene-glycol, and useful branched aliphatic diols are 2-methyl-1,3-propanediol, 2,2-dimethyl-1,3-propanediol (neopentyl glycol), 2-methyl-2-ethyl-1,3-propanediol, 2-methyl-2-isopropyl-1,3-propanediol, 2,2-diethyl-1,3-propanediol, 2-methyl-2-butyl-1,3-propanediol, 2-ethyl-2-butyl-1,3-propanediol, 2-methyl-2,4-pentanediol. 2,2,4-trimethyl-1,3-pentanediol, and 2-ethyl-1,3-hexanediol.

It is preferred to use cycloaliphatic diols in component H2. These can be single compounds, or mixtures of two or more compounds. In such mixtures, it is preferred that at least 60% of the hydroxyl groups in component H2 stem from cycloaliphatic diols, this fraction is at least 70% in a particularly preferred embodiment, and at least 80% in an especially preferred embodiment. The additional hydroxyl groups are provided by acyclic linear or branched aliphatic diols as mentioned supra. It is preferred to use branched aliphatic diols, as mentioned supra. The fraction of hydroxyl groups in H2 which stem from unbranched linear aliphatic diols should not exceed 10%. The best results have been obtained when the fraction of hydroxyl groups in H2 which stem from cycloaliphatic diols is at least 90%, and the remainder stems from acyclic aliphatic branched diols.

Component H3 has, on average, more than two, and less than four, and preferably, three hydroxyl groups per molecule, and comprises at least one, preferably one to three, more preferably one to two, and very preferably precisely one branched aliphatic or cycloaliphatic trihydroxy compound which may comprise heteroatoms, particularly nitrogen. A preferred cyclic compound is 1,3,5-tris(2-hydroxyethyl) isocyanurate, commonly referred to as "THEIC". Other useful cycloaliphatic trihydroxy compounds are hexahydro-1,3,5-tris-(hydroxyethyl)-s-triazine (CAS No. 4719-04-4), and 1,2,4- and 1,3-5-trihydroxycyclohexane. The branched aliphatic trihydroxy compounds that can be used for the invention have at least two, more preferred, three hydroxymethyl groups bound to the same carbon atom. Preferred branched aliphatic trihydroxy compounds are trimethylolethane, trimethylol-propane, and trimethylolbutane. Mixtures of cycloaliphatic trihydroxy compounds and acyclic aliphatic branched trihydroxy compounds can be used, where it is preferred to use mixtures having mass fractions of from 10% to 90% of cycloaliphatic trihydroxy compounds and mass fractions of from 90% to 10% of acyclic aliphatic branched trihydroxy compounds.

The amounts of H2 and H3 should preferably be chosen such that in the amount of substance of hydroxyl groups n(OH) in the hydroxy-functional compounds H2 and H3, n(OH,H2) and n(OH,H3) obey the following rules: $20\% \leq n(OH,H2)/[n(OH,H3)+n(OH,H2)] \leq 45\%$ and $55\% \leq n(OH,H3)/[n(OH,H3)+n(OH,H2)] \leq 80\%$, and preferably, $25\% \leq n(OH,H2)/[n(OH,H3)+n(OH,H2)] \leq 50\%$ and $50\% \leq n(OH,H3)/[n(OH,H3)+n(OH,H2)] \leq 75\%$, and particularly preferred, $30\% \leq n(OH,H2)/[n(OH,H3)+n(OH,H2)] \leq 40\%$ and $60\% \leq n(OH,H3)/[n(OH,H3)+n(OH,H2)] \leq 70\%$. If compounds H3 with four or more hydroxyl groups per molecule are used, it is preferred to reduce their amount of substance-fraction in the mass of these hydroxy-functional compounds in order to avoid gelation, or to increase the amount of substance-fraction of dihydroxy compounds H2.

The isocyanate-reactive component R having at least one radically polymerisable olefinic unsaturation per molecule can be grouped into the class R1 having one radically polymerisable olefinic unsaturation per molecule, the class R2 having two radically polymerisable olefinic unsaturation per molecule, and the class R3 having three or more radically polymerisable olefinic unsaturation per molecule. They have usually one, but possibly also more than one, isocyanate-reactive group per molecule, which is preferably a hydroxyl group. The preferred compounds are esters of hydroxyl compounds made by reaction of acrylic acid, or methacrylic acid, or a derivative of any of these, with polyhydric alcohols having at least two hydroxyl groups per molecule, these reaction products are usually mixtures of esters, unless separated by fractionated distillation, or other means of separation such as fractionated crystallisation from the melt, and the chemical name given to them is usually the name of the ester which constitutes the largest share in the mixture of esters. Therefore, the number of radically polymerisable groups per molecule is usually an average number.

Preferably, the isocyanate-reactive component R comprises compounds of at least two different classes selected from the group consisting of the classes R1, R2, and R3 according to the invention. It is most preferred to use at least one compound each of both class R2 and class R3 compounds. It is also preferred to use one compound of class R2 together with one compound of class R3. In the case of using a large excess of compounds R3 over R2, wherein the ratio $n(>C=C<, R3)/n(>C=C<, R2)$ of the amount of substance of olefinically unsaturated polymerisable groups in R3, $n(>C=C<, R3)$ to the amount of substance of olefinically unsaturated polymerisable groups in R2, $n(>C=C<, R2)$, is more than 6 mol/mol, it is preferred to add compounds of the class R1 to avoid brittleness of the coating film obtained. It is preferred to keep the ratio $n(>C=C<, R3)/[n(>C=C<, R2)+n(>C=C<, R1)]$ between 1.5 mol/mol and 5.5 mol/mol in order to obtain coating films with the desired elasticity and toughness while preserving the formation of a coherent film already after flushing with air.

The class R1 includes compounds having on average one olefinic unsaturation per molecule, and one isocyanate reactive group per molecule, particularly monoacrylates of diols and polyhydric alcohols such as 2-hydroxyethyl acrylate, 2- or 3-hydroxypropyl acrylate and 4-hydroxybutylacrylate, 1,5-pentanediol monoacrylate, 1,6-hexanediol monoacrylate, glyceryl monoacrylate, trimethylolpropane monoacrylate, pentaerythritol monoacrylate, and also 4-hydroxybutyl vinyl ether, 2-aminoethylacrylate, 2-aminopropylacrylate, 3-aminopropyl-acrylate, 4-aminobutylacrylate, 6-aminohexylacrylate, 2-thioethylacrylate, 2-aminoethyl-acrylamide, 2-aminopropylacrylamide, 3-aminopropylacrylamide, 2-hydroxyethylacryl-amide, 2-hydroxypropylacrylamide, and 3-hydroxypropylacrylamide, and also the mono-acrylates of polyethylene glycol with a molar mass of from 106 g/mol to 238 g/mol, the mono-acrylates of the cycloaliphatic alcohols such as 1,2- and 1,3-cyclopentane-diols, 1,2-, 1,3,- and 1,4-cyclohexanediols, 1,1-, 1,2-, 1,3-, and 1,4-bis(hydroxymethyl)cyclo-hexanes, 1,1-, 1,2-, 1,3-, and 1,4-bis (hydroxyethyl)cyclohexanes, bis(4-hydroxycyclohexane)-isopropylidene, and the isomer mixture of 3(4),8(9)-dihydroxymethyl-tricyclo$(5.2.1.0^{2.6})$decane, and the methacrylate analogues of all compounds mentioned. Mono-acrylates of ethoxylated or propoxylated derivatives preferably having from two to ten oxyalkylene units per hydroxyl group of the base compound, of these compounds R1 can, of course, also be used. Methacrylates can also be used, alone or in mixture with acrylates, but acrylates are usually preferred due to their higher reactivity in radiation-induced radical polymerisation.

The class R2 includes compounds having on average two olefinic unsaturations per molecule, and one isocyanate reactive group per molecule, particularly diacrylates of tri-hydric alcohols such as glyceryl diacrylate, trimethylolpropane diacrylate, trihydroxycyclo-hexyldiacrylate, and tris-hydroxyethylisocyanurate diacrylate. Ethoxylated or propoxylated derivatives of these compounds R2 can, of course, also be used. Preferred are cycloaliphatic and branched aliphatic compounds R2. Specific mention is made of diacrylates of tri-methylolethane, trimethylolpropane and trimethylolbutane, and of ethoxylates and/or propoxylates of these, preferably having from two to ten oxyalkylene units per hydroxyl group of the base compound. Methacrylates can also be used, alone or in mixture with acrylates, but acrylates are usually preferred due to their higher reactivity in radiation-induced radical polymerisation. Further useful compounds of class R2 are divinyl ethers or diallyl ethers of bis-hydroxymethylcyclohexane isomers, such as 1,4-cyclohexanedimethanol divinyl ether.

The class R3 includes compounds having on average three or more olefinic unsaturations per molecule, and one isocyanate reactive group per molecule, particularly pentaerythritol tri-acrylate, diglycerol triacrylate, ditrimethylolpropane triacrylate, ditrimethylolbutane tri-acrylate, erythritol triacrylate, and threitol triacrylate, all having three olefinic unsaturations per molecule, and dipentaerythritol-pentaacrylate, dierythritol pentaacrylate, dithreitol pentaacrylate, and dipentaerythritol pentaacrylate all having five olefinic unsaturations per molecule. Of course, all of these basic alcohols may be ethoxylated or propoxylated before acrylation thereof as detailed in the section dealing with compounds R2. Instead of the acrylates mentioned, also the methacrylates can be used, alone, or in mixture with acrylates.

It is preferred to use a mixture R which comprises mass fractions w(R1), w(R2) and w(R3) of R1, R2, and R3 in the following relations: $w(R1) \leq 10\%$; $10\% \leq w(R2) \leq 45\%$; and 50%≤w(R3)≤90%. Particularly preferred are compositions with w(R1)≤5%; 15%≤w(R2)≤40%; and 55%≤w(R3)≤85%. Of course, the sum of the mass fractions w(R1), w(R2) and w(R3) is always 100%.

The component A comprises at least one, preferably precisely one, compound which has at least one, one or two for example, preferably precisely two isocyanate-reactive groups and at least one acid group. By acid groups here are meant carboxylic acid, sulfonic acid, phosphoric or phosphonic acid groups, preferably carboxylic acid or sulfonic acid groups, and more preferably carboxylic acid groups. Examples of isocyanate-reactive groups are —OH, —SH, —NH$_2$, or —NHR', wherein R' is preferably an alkyl group having from one to four carbon atoms, the isocyanate-reactive groups are preferably —OH or —NH$_2$, and very preferably —OH. Preferred compounds A are dimethylolpropionic acid, dimethylolacetic acid, and dimethylolbutyric acid, as well as aminoethanesulfonic acid and N,N-bis(2-hydroxy-ethyl)-2-aminoethanesulfonic acid.

The at least one base B is either an organic amine selected from the group consisting of trialkylamines, and trialkanolamines, wherein the alkyl groups and alkylene groups have independently of each other, from two to twelve carbon atoms, or an inorganic base selected from the group consisting of alkali hydroxides and earth alkali hydroxides. Preferred bases are alkali hydroxides, particularly lithium hydroxide, sodium hydroxide, and potassium hydroxide, and also the amines triethylamine, tripropylamine, triisopropylamine, tributylamine isomers, and the hydroxyamines triethanolamine and triisopropanolamine. It is also possible to use mixtures of the amines or of the alkali hydroxides mentioned.

Particularly preferred are the following combinations:
H3 is selected from the group consisting of tris-hydroxyethylisocyanurate ("THEIC") and trimethylolpropane,
H2 is selected from the group consisting of 1,4-bishydroxymethyl cyclohexane (cyclohexanedimethanol, "CHDM") and the isomer mixture of 3(4), 8(9)-dihydroxymethyl-tricyclo(5.2.1.0$^{2.6}$)decane ("TCD-DM"),
I is the isomer mixture of 4,4'- or 2,4'-di(isocyanatocyclohexyl)methane ("H12MDI"),
no R1 is used,
R2 is the diacrylate of tris-hydroxyethylisocyanurate ("THEIC-DA"),
R3 is selected from the group consisting of pentaerythritol triacrylate ("PE3A"), dipentaerythritol pentaacrylate ("DPE5A") and the triacrylate of an ethoxylated pentaerythritol having, on average, five oxyethylene units per molecule ("Penta-EO$_x$-triacrylate"), and
A is selected from the group consisting of 2,2-bis-hydroxymethyl acetic acid, 2,2-bis-hydroxymethyl propionic acid, and 2,2-bis-hydroxymethyl butyric acid, (dimethylolacetic acid, dimethylolpropionic acid, and dimethylolbutyric acid).

Among these combinations, the following have shown the best results and are therefore most preferred:
THEIC, CHDM, and H12MDI in step a, together with THEIC-DA and PE3A in step b,
THEIC, CHDM, and H12MDI in step a, together with TMP-DA and PE3A in step b,
THEIC, CHDM, and H12MDI in step a, together with THEIC-DA and DPE5A in step b,
THEIC, CHDM, and H12MDI in step a, together with THEIC-DA and Penta-EO$_x$-triacrylate in step b,
THEIC, TCD-DM and H12MDI in step a together with TMP-DA and PE3A in step b,
TMP, TCD-DM and H12MDI in step a together with TMP-DA and PE3A in step b, and
TMP, TCD-DM and H12MDI in step a together with THEIC-DA and DPE5A in step b.

The most favoured base is an aqueous solution of lithium hydroxide.

Examples of multifunctional polymerisable compounds M which may optionally be used are the di(meth)acrylates of ethylene glycol, diethylene glycol, triethylene glycol, 1,2-propane-diol, 1,3-propanediol, 1,4-butanediol, 1,3-butanediol, 1,5-pentanediol, 1,6-hexanediol, 1,8-octanediol, neopentyl glycol, 1,1-, 1,2-, 1,3-, and 1,4-cyclohexanedimethanol, 1,2-, 1,3-, or 1,4-cyclohexanediol, dipropylene glycol, tripropylene glycol, the di- or tri(meth)acrylates of glycerol, trimethylolethane, trimethylolpropane, and trimethylolbutane, wherein the formerly named compounds have a remaining hydroxyl group, the tri- or tetra-(meth)-acrylates of pentaerythritol, diglycerol, ditrimethylolethane, ditrimethylolpropane, ditri-methylolbutane, erythritol or threitol, wherein the formerly named compounds have a remaining hydroxyl group, and also di- and poly(meth)acrylates of sugar alcohols, such as, for example, sorbitol, mannitol, adonitol (ribitol), arabitol (lyxitol), xylitol, dulcitol (galactitol), maltitol, or isomalt, or of polyester polyols, polyetherols such as poly-THF having a molar mass of between 162 g/mol and 2000 g/mol, poly-1,3-propanediol having a molar mass of between 134 g/mol and 1178 g/mol, polyethylene glycol having a molar mass of between 106 g/mol and 898 g/mol, and also epoxy(meth)acrylates, polyester(meth)-acrylates, polyether(meth)acrylates, urethane (meth)acrylates as well as oligomeric and polymeric urethane (meth)acrylates, or polycarbonate(meth)acrylates, which optionally may also have been modified with one or more amines.

Preferred multifunctional polymerisable compounds are 1,2-propanediol di(meth)acrylate, 1,3-propanediol di(meth)acrylate, dipropylene glycol di(meth)acrylate, tripropylene glycol di(meth)acrylate, trimethylolpropane tri(meth)acrylate, ditrimethylol tetra(meth)acrylate, and dipentaerythritol hexa(meth)acrylate, polyester polyol (meth)acrylates, and polyether-polyol (meth)acrylates. Especially preferred multifunctional polymerisable compounds are trimethylolpropane tri(meth)acrylate and the tri(meth)acrylate of THEIC.

The reaction of step a) is preferably accelerated by addition of a suitable catalyst C. Such catalysts are known from the literature, as for example from G. Oertel (editor), Polyurethane, 3rd edition 1993, Carl Hanser Verlag, Munich, pages 104 to 110, section 3.4.1. "Kata-lysatoren"; preferred are organic amines, more particularly tertiary aliphatic, cycloaliphatic, or aromatic amines, Brønsted acids and/or Lewis-acidic organometallic compounds and/or organic salts or chelates of metals of groups 4 to 15 of the Periodic System of the Elements, with Lewis-acidic organometallic compounds being particularly preferred. Preferably these are Lewis-acidic organometallic compounds, for which, for example, tin compounds are suitable, such as, for example, tin(II) salts of organic carboxylic acids, examples being tin(II) diacetate, tin(II) dioctoate, tin(II) bis(ethylhexanoate), and tin(II) dilaurate, and the dialkyltin(IV) salts of organic carboxylic acids, examples being dimethyltin diacetate, dibutyltin diacetate, dibutyltin dibutyrate, dibutyltin bis(2-ethylhexanoate), dibutyltin dilaurate, dibutyltin maleate, dioctyltin dilaurate, and dioctyltin diacetate. It is possible, moreover, to use salts of aliphatic or aromatic carboxylic acids, particularly zinc(II) salts, such as zinc(II) dioctoate, and bismuth (III) salts such as bismuth (III) trioctoate, for example. Metal complexes are possible as well, such as acetylacetonates of iron, titanium, aluminium, zirconium, manganese, bismuth, nickel, zinc, and cobalt. Other metal catalysts have been described by Werner Blank et al. in "Catalysis of the isocyanate-hydroxyl reaction by non-tin catalysts", Progress in Organic Coatings, 1999, vol. 35, pages 19 to 29. Tin-free and zinc-free alternatives used include compounds of zirconium, of bismuth, of zinc, of titanium, and of aluminium, such as offered by TIB Chemicals AG, Mannheim. These are, for example, zirconium tetraacetylacetonate, and zirconium, bismuth, and aluminium chelates. Zinc compounds and bismuth compounds that are contemplated include those employing the following anions: F—, Cl—, ClO—, $ClO_3$—, $ClO_4$—, Br—, I—, $IO_3$—, CN—, OCN—, $NO_2$—, $NO_3$—, $HCO_3$—, $CO_3^{2-}$, $S^{2-}$, SH—, $HSO_3$—, $SO_3^{2-}$, $HSO_4$—, $SO_4^{2-}$, $H_2PO_2$—, $H_2PO_4$—, and $HPO_4^{2-}$. Preference here is given to the carboxylates of aliphatic acids which may be linear, or branched. Particularly preferred salts of zirconium and bismuth have monocarboxylate anions of aliphatic acids where the number of carbon atoms is from one to twenty. Particularly noteworthy in this context are formate, acetate, propionate, hexanoate, neodecanoate, stearate, isostearate, palmitate, isopalmitate, and 2-ethylhexanoate, as well as salts of hydroxycarboxylic acids such as glycolate, lactate, and hydroxybutyrate.

Among the zinc catalysts, the zinc carboxylates are preferred, more preferably those of carboxylates which have at least two carbon atoms, preferably at least six carbon atoms, more particularly zinc(II) diacetate, zinc(II) oxalate, zinc(II) dioctoate, zinc(II) acetylacetonate, or zinc(II) di-neodecanoate. Among the bismuth catalysts, the bismuth carboxylates are preferred, more preferably those of carboxylates of hydroxy acids, or of longer chain aliphatic acids which have at least six carbon atoms, more particularly bismuth octoates, ethylhexanoates, neodecanoates, or pivalates, as well as glycolate, lactate, and hydroxybutyrate. These may also be mixtures of different metals among those named supra. Among the titanium compounds, the titanium tetraalkoxides $Ti(OR)_4$ are preferred, more preferably those of alcohols ROH having from one to eight carbon atoms, examples being methanol, ethanol, isopropanol, n-propanol, n-butanol, isobutanol, sec-butanol, tert-butanol, n-hexanol, n-heptanol, and n-octanol, preferably methanol, ethanol, isopropanol, n-propanol, n-butanol, and tert-butanol, more preferably isopropanol and n-butanol. These catalysts are suitable for solvent-based, water-based and/or blocked systems. Molybdenum, tungsten, and vanadium catalysts are described in particular for the reaction of blocked polyisocyanates in WO 2004/076519 A1 and WO 2004/076520 A1.

Preferred Lewis-acidic organometallic compounds are dimethyltin diacetate, dibutyltin dibutyrate, dibutyltin bis(2-ethylhexanoate), dibutyltin didecanoate, dibutyltin dilaurate, dioctyltin dilaurate, zinc(II) dioctoate, zinc(II) didecanoate, zirconium acetylacetonate, zirconium 2,2,6,6-tetramethyl-3,5-heptanedionate, and bismuth 2-ethylhexanoate, bismuth decanoate, bismuth neodecanoate, and the corresponding bismutyl salts.

Particularly preferred, however, are zinc neodecanoate, zinc decanoate, and zinc 2-ethylhexanoate; bismuth or bismutyl neodecanoate, bismuth or bismutyl decanoate and bismuth or bismutyl 2-ethylhexanoate are especially preferred. It has been found that bismuth compounds which are salts or chelates are particularly useful as these do not have a metal constituent which causes environmental problems, and have catalytic activity which is on par with that of the tin compounds that were used in the past. Mixed metal catalysts including bismuth and zinc salts and chelates of these metals are particularly preferred, and are preferably used to at least partly, or totally, replace tin catalysts.

It is possible to boost the activity of the catalysts additionally through the presence of acids—by means, for example, of acids having a pKa of <2.5, as described in EP 2 316 867 A1, or having a pKa of between 2.8 and 4.5, as described in WO 2004/029121 A1. It is preferred to use acids having a pKa of not more than 4.8, more preferably of not more than 2.5. It is also conceivable to carry out the reaction without catalyst, though in that case the reaction mixture has to be exposed to relatively high temperatures and/or relatively long reaction times.

In order to prevent unwanted polymerisation of the (meth) acrylate groups during the reaction, polymerisation inhibitors may be added, such as butyl hydroxytoluene, and the monomethyl ether of hydroquinone. Inhibitors of this kind are described for example in WO 2003/035 596 A, page 5, line 35 to page 10, line 4, to which reference may herewith be made in the context of the present disclosure content.

A preferred embodiment of the present invention may comprise the use of incorporable polymerisation inhibitors, i.e., inhibitors which comprise an —OH or —$NH_2$ group—that is, an isocyanate-reactive group. One preferred example of such inhibitors is 4-hydroxy-2,2,6,6-tetramethylpiperidine-N-oxyl. The reaction may be considered at an end when the mass fraction of NCO groups has reached the theoretical conversion of at least 95%, preferably at least 97%, and more preferably at least 98%. Should unreacted isocyanate groups still be present after step c), the reaction may be completed by reaction with a monoalcohol under the above reaction conditions.

Following the preparation, the reaction mixture is dispersed or diluted in water. The mass fraction of solids usually set in this case is from 35% to 45%, though it may also be up to 60%. The average particle size in the dispersion is generally from 10 nm to 150 nm, preferably from 15 nm to 120 nm, more preferably 20 nm to 100 nm, and very preferably from 25 nm to 90 nm.

The reaction may take place preferably in the presence of the low molar mass (meth)acrylate M, which not only functions as a solvent for the individual components and for the urethane (meth)acrylate U, but is also a constituent of the coating material later on, at the application stage.

For this purpose, the entire amount of the compound M may be introduced at the beginning of the reaction, or may be added in the course of the reaction. It may, however, also be sensible not to add some of the low molecular mass (meth)acrylate M until after the reaction is ended, in order to carry out further dilution of the urethane (meth)acrylate M. In this case, it is needed to adapt the amount of component A in the reaction mixture of step c) so that the urethane (meth)acrylate can serve as emulsifier for the monomer M.

The polyurethane (meth)acrylate U obtained in accordance with the invention, and optionally in mixture with the low molar mass (meth)acrylate M, may be employed with advantage as or in radiation-curable coating materials. The amount of polyurethane (meth)acrylate U ought to be calculated such that the low molar mass (meth)acrylate M present in the mixture is likewise dispersed.

These coating materials may comprise further constituents:

Where the coating materials are cured not with electron beams but instead by means of UV radiation, it is preferable to include at least one photoinitiator which is able to initiate the polymerisation of ethylenically unsaturated double bonds.

Photoinitiators may be, for example, photoinitiators known to the skilled person, examples being those specified in "Advances in Polymer Science", Volume 14, Springer, Berlin 1974 or in K. K. Dietliker, Chemistry and Technology of UV and EB Formulation for Coatings, Inks and Paints, Volume 3; Photoinitiators for Free Radical and Cationic Polymerisation, P. K. T. Oldring (Eds), SITA Technology Ltd, London. Suitable are, for example, mono- or bisa-cylphosphine oxides, as described for example in EP 0 007 508 A2, EP 0 057 474 A2, DE 196 18 720 A1, EP 0 495 751 A1, and EP 0 615 980 A2, examples being 2,4,6-trimethyl-benzoyldiphenylphosphine oxide, ethyl 2,4,6-trimethylbenzoylphenylphosphinate, bis-(2,4,6-trimethylbenzoyl)-phenylphosphine oxide, benzophenones, hydroxyacetophenones, phenylglyoxylic acid and its derivatives, or mixtures of these photoinitiators. Examples that may be mentioned include benzophenone, acetophenone, acetonaphthoquinone, methyl ethyl ketone, valerophenone, hexanophenone, alpha-phenylbutyrophenone, p-morpholino-propiophenone, dibenzosuberone, 4-morpholino-benzophenone, 4-morpholinodeoxybenzoin, p-diacetylbenzene, 4-aminobenzophenone, 4'-methoxyacetophenone, beta-methylanthra-quinone, tert-butylanthraquinone, anthraquinonecarboxylic esters, benzaldehyde, alpha-tetralone, 9-acetyl-phenanthrene, 2-acetylphenanthrene, 10-thioxanthenone, 3-acetylphenan-threne, 3-acetyl-indole, 9-fluorenone, 1-indanone, 1,3,4-triacetylbenzene, thioxan-then-9-one, xanthen-9-one, 2,4-dimethylthioxanthone, 2,4-diethylthioxanthone, 2,4-diisopropylthio-xanthone, 2,4-dichlorothioxanthone, benzoin, benzoin isobutyl ether, chloroxanthenone, benzoin tetrahydropyranyl ether, benzoin methyl ether, benzoin ethyl ether, benzoin butyl ether, benzoin isopropyl ether, 7H-benzoin methyl ether, 7H-benz[de]anthracen-7-one, 1-naphthaldehyde, 4,4'-bis(dimethylamino)benzophenone (Michler's ketone), 4-phenylbenzophenone, 4-chlorobenzophenone, 1-acetonaphthone, 2-acetonaphthone, 1-benzoylcyclo-hexan-1-ol, 2-hydroxy-2,2-dimethylacetophenone, 2,2-dimethoxy-2-phenylacetophenone, 2,2-diethoxy-2-phenylacetophenone, 1,1-dichloroacetophenone, 1-hydroxyacetophenone, aceto-phenone dimethyl ketal, o-methoxybenzophenone, triphenylphosphine, tri-o-tolylphos-phine, benz[a]anthracene-7,12-dione, 2,2-diethoxyacetophenone, benzil ketals, such as benzil dimethyl ketal, 2-methyl-1-[4-(methylthio)phenyl]-2-morpholinopropan-1-one, anthra-quinones such as 2-methyl-anthraquinone, 2-ethylanthraquinone, 2-tert-butylanthraquinone, 1-chloroanthraquinone, and 2-amylanthraquinone, and alpha-dicarbonyl compounds such as 2,3-butanedione (diacetyl).

Also suitable are non-yellowing or low-yellowing photoinitiators of the phenylglyoxalic ester type, as described in DE 198 26 712 A1, DE 199 13 353 A1, or WO 1998/033761 A1. Likewise conceivable as photoinitiators are polymeric photoinitiators, such as, for example, the diester of carboxymethoxybenzophenone with polytetramethylene glycols of varying molar mass, preferably 200 to 250 g/mol (CAS 515136-48-8), and also CAS 1246194-73-9, CAS 813452-37-8, CAS 71512-90-8, CAS 886463-10-1, or other polymeric benzophenone derivatives. One preferred embodiment uses silsesquioxane compounds as photoinitiators having at least one group with initiating activity, of the kind described in WO 2010/063612 A1, especially from page 2, line 21 to page 43, line 9 therein, hereby incorporated by reference as part of the present disclosure content, preferably from page 2, line 21 to page 30, line 5, and also the compounds described in the examples of WO 2010/063612 A1. Typical mixtures comprise, for example, 2-hydroxy-2-methyl-1-phenylpropan-2-one, and 1-hydroxy-cyclohexyl phenyl ketone, bis(2,6-dimethoxybenzoyl)-2,4,4-trimethylpentylphosphine oxide and 2-hydroxy-2-methyl-1-phenylpropan-1-one, benzophenone and 1-hydroxycyclohexyl phenyl ketone, bis(2,6-dimethoxybenzoyl)-2,4,4-trimethylpentylphosphine oxide and 1-hydroxy-cyclohexyl phenyl ketone, 2,4,6-trimethylbenzoyldiphenylphosphine oxide and 2-hydroxy-2-methyl-1-phenylpropan-1-one, 2,4,6-trimethylbenzophenone and 4-methyl-benzophenone or 2,4,6-tri-methyl-benzophenone, and 4-methylbenzophenone and 2,4,6-trimethylbenzoyldiphenyl-phosphine oxide. Preference among these photoinitiators is given to 2,4,6-trimethylbenzoyl-diphenylphosphine oxide, ethyl 2,4,6-trimethylbenzoyl-phenyl-phosphinate, bis(2,4,6-tri-methylbenzoyl)phenylphosphine oxide, benzophenone, 1-benzoyl-cyclohexan-1-ol, 2-hydroxy-2,2-dimethylacetophenone, and 2,2-dimethoxy-2-phenyl-acetophenone.

The coating materials comprise the photoinitiators preferably in a mass fraction of from 0.05% to 10%, more preferably 0.1% to 8%, in particular 0.2% to 5%, based on the total mass of the polyurethane (meth)acrylate U. The coating materials may comprise further customary coatings additives, such as flow control agents, defoamers, UV absorbers, dyes, pigments and/or fillers. Suitable fillers comprise silicates, e.g., silicates obtainable by hydrolysis of silicon tetrachloride, such as Aerosil™ from Degussa, siliceous earth, talc, aluminium silicates, magnesium silicates, and calcium carbonates, etc. Suitable stabilisers comprise typical UV absorbers such as oxanilides, triazines, and benzotriazole, and benzophenones. They can be used alone or together with suitable free-radical scavengers, examples being sterically hindered amines such as 2,2,6,6-tetramethylpiperidine, 2,6-di-tert-butylpiperidine or derivatives thereof, e.g., bis(2,2,6,6-tetramethyl-4-piperidyl) sebacate. Stabilisers are used usually in mass fractions of from 0.1% to 5.0%, based on the mass of those components comprised in the preparation that make of the final solid coating material.

The dispersions of the invention are particularly suitable as coating material or in coating materials, more preferably for coating substrates such as wood, paper, textile, leather, nonwoven, plastics surfaces, glass, ceramic, mineral building materials, such as cement mouldings and fiber-cement slabs, and, in particular, for coating metals or coated metals. The dispersions of the invention can be used with particular advantage for coating wood and wood materials and wood-containing substrates, such as fiberboard. Also conceivable would be the coating of substrates containing cellulose fiber, such as paper, paperboard or cardboard, for example. With very particular preference the dispersions are suitable for the coating of oak, spruce, pine, beech, maple, walnut, macore, chestnut, plane, robinia, ash, birch, stone pine, and elm, and also cork. They are also particularly useful in the preparation of printing inks, particularly for flexographic printing inks.

The substrates are coated in accordance with customary methods that are known to the skilled person, involving the application of at least one coating material to the substrate that is to be coated, in the desired thickness, and removal of the volatile constituents of the coating materials. This process can be repeated one or more times if desired. Application to the substrate may take place in a known way, e.g., by spraying, curtain coating, brushing, rolling, roller-coating or pouring. The coating thickness is generally chosen within a range of areic mass of from about 3 g/m$^2$ to 400 g/m$^2$, preferably from 10 g/m$^2$ to 200 g/m$^2$, and more preferably from 10 g/m$^2$ to 80 g/m$^2$.

Optionally, if two or more films of the coating material are applied one on top of another, a radiation cure and intermediate sanding may take place after each coating operation.

Radiation curing is accomplished by exposure to high-energy radiation, i.e., UV radiation or daylight, preferably light with a wavelength of 250 nm to 600 nm, or by irradiation with high-energy electrons (electron beams; 150 keV to 300 keV). Examples of radiation sources used include high-pressure mercury vapor lamps, lasers, pulsed lamps (flashlight), halogen lamps or excimer emitters. The radiation dose normally sufficient for crosslinking in the case of UV curing is situated within the range from 80 mJ/cm$^2$ to 3000 mJ/cm$^2$. Preference is given to low-pressure mercury lamps, medium-pressure lamps with high-pressure lamps, which may optionally have been doped with gallium or iron, and also, furthermore, to LED lamps. Irradiation may also, optionally, be carried out in the absence of oxygen, e.g., under an inert gas atmosphere. Suitable inert gases include, preferably, nitrogen, noble gases, carbon dioxide or combustion gases. Irradiation may also take place with the coating material being covered by transparent media. Transparent media are, for example, polymeric films, glass or liquids, e.g., water. Particular preference is given to irradiation in the manner as is described in DE 199 57 900 A1.

In one preferred process, curing takes place continuously, by passing the substrate treated with the coating material at constant speed past a radiation source. For this it is necessary for the cure rate of the coating material to be sufficiently high. This varied course of curing over time can be exploited in particular when the coating of the article is followed by a further processing step in which the film surface comes into direct contact with another article or is worked on mechanically. The advantage of the coating materials is that the coated wood substrates exhibit good wet transparency and high grain highlighting. At the same time, on drying at elevated temperature, a very smooth surface can be obtained. The films exhibit high fullness and optical transparence. A particular advantage of the systems according to the invention is the fact that physically drying films are formed after coating of the substrates before subjecting to actinic radiation without chain extension, and without addition of amines to introduce urea structures into the polymer.

The invention is illustrated by means of the following nonlimiting examples.

EXAMPLES

Example 1 Stepwise Synthesis of a Polyurethane Acrylate 1a) 87 g of tris(2-hydroxyethyl)isocyanurate ("THEIC"), 43.3 g of 1,4-bishydroxymethyl cyclohexane ("CHDM"), 3 g of butylhydroxytoluene, 629.6 g of bis(4-isocyanatocyclohexyl)-methane (H$_{12}$MDI, Desmodur® W, Covestro), 1300 g of acetone, and a first portion of 1 g of bismuth tris(2-ethylhexanoate) were charged into a resin kettle equipped with a thermometer, a stirrer, a dropping funnel, and a reflux condenser, and heated to 60° C. under stirring. The reaction mass was held under stirring at 60° C. for about from two to three hours until a mass fraction of unreacted isocyanate groups of less than 6.5% was reached.

1b) 185 g of the diacrylate of tris(2-hydroxyethyl)isocyanurate ("THEIC-DA"), 1 g of 2,6-di-tert-butyl-4-methylphenol ("BHT"), 387.8 g of pentaerythritol triacrylate ("PE3A"), and a second portion of 1 g of bismuth tris(2-ethylhexanoate) were added and kept under reflux at 60° C. for about three to four hours until the mass fraction of unreacted isocyanate groups had fallen below 2.1%.

1c) 93.8 g of 2,2-bis(hydroxymethyl)propionic acid ("DMPA") were then added under stirring at 60° C. and held until the mass fraction of free isocyanate groups had fallen under 0.2%.

1d) A solution of a neutralisation agent (83.25 g of triethanolamine ("TOLA"), dissolved in 244 g of water with a temperature of 25° C.), was added in portions under good stirring over thirty minutes. The degree of neutralisation was 80%.

1e) Further 1.8 kg of desalinated water with a temperature of 25° C. was slowly added under good stirring.

1f) Acetone was distilled off under reduced pressure (30 hPa) at 35° C., and distillation was continued until all acetone was separated. Loss of water in the distillation step has been compensated by addition of further 170 g of desalinated water. The dispersion thus obtained was immediately filtered through a needled polypropylene filter bag with a pore size of 25 μm, and tested for pH (8.3, measured on an aqueously diluted dispersion having a mass fraction of solids of 10%, and at 25° C.) and viscosity (cone and plate rheometer, 25° C., 450 mPa·s at a shear rate of 25 s$^{-1}$).

Examples 2 to 8

Using the same procedure as in Example 1, which has been repeated in the following table 1, further polyurethane acrylate dispersions were made from the following starting materials.

The following additional abbreviations were used in this table 1:

TCD-DM is 3(4), 8(9)-dihydroxymethyl-tricyclo(5.2.1.0$^{2,6}$)decane, isomer mixture;

TMP-DA is trimethylolpropane diacrylate;

TMP is trimethylolpropane;

TEA is triethylamine;

DPE5A is dipentaerythritol pentaacrylate.

All dispersions of these examples 1 to 8 in table 1 have a mass fraction of solids of 43%.

TABLE 1

| steps Example | a | b | c | d |
|---|---|---|---|---|
| 1 | THEIC, 87 g CHDM, 43.3 g H12MDI, 629.6 g | THEIC-DA, 185 g PE3A, 387.5 g | DMPA, 93.8 g | TOLA, 83.3 g |
| 2 | THEIC, 87 g TCD-DM, 58.9 g H12MDI, 629.6 g | TMP-DA, 122,7 g PE3A, 387,5g | DMPA, 93.8 g | TOLA, 83.3 g |
| 3 | TMP, 44.7 g TCD-DM, 58.9 g H12MDI, 629.6 g | TMP-DA, 122.77 g DPE5A, 681.8 g | DMEA, 84.0 g | TEA, 56.5 g |
| 4 | TMP, 44.7 g TCD-DM, 58.9 g H12MDI, 629.6 g | THEIC-DA, 185 g PE3A, 387.5 g | DMEA, 84.0 g | KOH (solid), 17.2 g |
| 5 | TMP, 44.7 g TCD-DM, 58.9 g H12MDI, 629.6 g | THEIC-DA, 185 g PE3A, 533 g | DMBA, 103.6 g | NaOH (solid), 21.9 g |
| 6 | THEIC, 87 g CHDM, 43.3 g H12MDI, 629.6 g | THEIC-DA, 185 g PE3A, 387.5 g | DMPA, 93.8 g | LiOH•H$_2$O, 13.17 g 6* |
| 7 | THEIC, 87 g CHDM, 43.3 g H12MDI, 629.6 g | THEIC-DA, 185 g DPE5A, 681.8 g | DMPA, 93.8 g | LiOH•H$_2$O, 13.45 g 7* |

TABLE 1-continued

| steps Example | a | b | c | d |
|---|---|---|---|---|
| 8 | THEIC, 87 g CHDM, 43.3 g H12MDI, 629.6 g | THEIC-DA, 185 g Penta-(EO)x-tri acrylate, 650 g | DMPA, 93.8 g | LiOH•H$_2$O, 13.45 g 8* |

*6: added as 267.3 g of an aqueous solution with a mass fraction of solute of 5%.
*7: added as 269 g of an aqueous solution with a mass fraction of solute of 5%.
*8: added as 269 g of an aqueous solution with a mass fraction of solute of 5%.

Production of Films and Mechanical Test

The dispersions or solutions from the inventive examples were admixed with a mass fraction of 2% of Omnirad® 500 photoinitiator (mixture of mass fractions of 50% each of 1-hydroxy-cyclohexyl phenol ketone and benzophenone, IGM Resins B.V.) and applied to a pre-sanded wood substrate, using a four-way bar applicator. The coated substrate was flashed at from 60° C. to 80° C. in a forced-air oven for from five to ten minutes, and irradiated in a UV unit, on a conveyor belt at 10 m/min with one or two UV lamps (120 W/cm, medium-pressure mercury lamps). The coated substrate was then re-sanded (160 grade) and subsequently coated again (as above), dried and UV cured. The films were through-cured (fingernail test), and exhibited high pendulum hardness in the König test. The following results were found:

TABLE 2

Hardness development on glass (80 μm dry film thickness, one layer); Scratch Resistance on wood (two layers, 80 μm each, sanding in between, 1 = best, no traces; 5 = worst):

| Clear Coating from Example | König Hardness after flash-off | König Hardness after UV curing | Scratch Resistance after UV Curing |
|---|---|---|---|
| 1 | 40 s | 233 s | 1 |
| 2 | 15 s | 228 s | 1 |
| 3 | 29 s | 169 s | 1 |
| 4 | 60 s | 199 s | 1 |
| 5 | not determined | 216 s | 2 |
| 6 | 130 s | 244 s | 1 |
| 7 | 19 s | 140 s | 1 |
| 8 | 32 s | 220 s | 1 |

All tested clear coating films showed good physical drying already after flash-off, and very good hardness and scratch resistance after UV curing.

Chemical Resistance

Selected clear coating formulations from the above tables 1 and 2 have also been tested for chemical resistance, and resistance against selected liquid food products. The cured substrates were contacted with the agents mentioned at 25° C. Results are listed in table 3.

TABLE 3

Chemical and Liquid Food Resistance

| Clear Coating from Example | 6 | 7 | 8 |
|---|---|---|---|
| Water | OK after 16 h | OK after 16 h | OK after 16 h |
| Ethanol (98%) | Softening starts after 7 h | Softening starts after 7 h | Softening starts after 5 h |
| Acetone | Softening starts after 6 h | Softening starts after 7 h | Softening starts after 5 h |
| Coffee | OK after 16 h | OK after 16 h | OK after 16 h |
| Mustard | OK after 16 h | OK after 16 h | Slight discolouration after 16 h |
| Ketchup | OK after 16 h | Slight discolouration after 16 h | OK after 16 h |

OK: No visible change or damage

All coatings made showed good chemical and liquid food resistance properties.

The invention claimed is:

1. A water-dispersible polyurethane (meth)acrylate U substantially synthesised from at least one multifunctional aromatic or (cyclo)aliphatic isocyanate I, at least one (cyclo)aliphatic diol H2 having a number of carbon atoms of from two to twenty, at least one (cyclo)aliphatic triol H3 having a number of carbon atoms of from three to twenty, an aliphatic hydroxyacid A having at least two carbon atoms, at least one hydroxyl group, and at least one acid group which is selected from the group consisting of a carboxyl group, a sulfonic acid group, or a phosphoric or phosphonic acid group, and at least one component R having at least one isocyanate-reactive group and at least one radically polymerisable olefinically unsaturated group, at least one base B for at least partial neutralisation of the acid groups of component A, and a catalyst C for urethane formation which is a salt or a chelate complex of a metal of any of groups 3 to 15 of the Periodic System of the Elements;
wherein the at least one component R having at least one isocyanate-reactive group and at least one radically polymerisable olefinically unsaturated group comprises compounds of at least two different classes selected from the group consisting of the classes R1, R2, and R3, wherein the class R1 comprises compounds having on average one olefinic unsaturation per molecule, and one isocyanate reactive group per molecule, the class R2 comprises compounds having on average two olefinic unsaturations per molecule, and one isocyanate reactive group per molecule, and the class R3 comprises compounds having on average three or more olefinic unsaturations per molecule, and one isocyanate reactive group per molecule.

2. The water-dispersible polyurethane (meth)acrylate U of claim 1 wherein the at least one multifunctional isocyanate I is a (cyclo)aliphatic isocyanate.

3. The water-dispersible polyurethane (meth)acrylate U of claim 1, wherein the at least one diol H2 is a cycloaliphatic diol.

4. The water-dispersible polyurethane (meth)acrylate U of claim 1, wherein the at least one triol H3 is a cycloaliphatic triol or a branched aliphatic triol.

5. The water-dispersible polyurethane (meth)acrylate U of claim 1, wherein at least one of the compounds R1, R2, and R3, is an acrylate ester or a methacrylate ester.

6. The water-dispersible polyurethane (meth)acrylate U of claim 1, wherein the at least one base B is an organic amine selected from the group consisting of trialkylamines, and trialkanol-amines, wherein the trialkylamines or traialkanolamines comprise alkyl groups and alkylene groups having independently of each other, from two to twelve carbon atoms, or an inorganic base selected from the group consisting of alkali hydroxides and earth alkali hydroxides.

7. The water-dispersible polyurethane (meth)acrylate U of claim 1, wherein the catalyst C for urethane formation is selected from the group consisting of organic amines, Brønsted acids, Lewis-acidic organometallic compounds, and organic salts or chelates of metals of groups 4 to 15 of the Periodic System of the Elements.

8. The water-dispersible polyurethane (meth)acrylate U of claim 2, wherein
wherein the at least one diol H2 is a cycloaliphatic diol, the at least one triol H3 is a cycloaliphatic triol or a branched aliphatic triol, the at least one component R having at least one isocyanate-reactive group and at least one radically polymerisable olefinically unsaturated group comprises compounds of at least two different classes selected from the group consisting of the classes R1, R2, and R3, wherein the class R1 comprises compounds having on average one olefinic unsaturation per molecule, and one isocyanate reactive group per molecule, the class R2 comprises compounds having on average two olefinic unsaturations per molecule, and one isocyanate reactive group per molecule, and the class R3 comprises compounds having on average three or more olefinic unsaturations per molecule, and one isocyanate reactive group per molecule,
the at least one base B is an organic amine selected from the group consisting of trialkylamines, and trialkanolamines, wherein the alkyl groups and alkylene groups have independently of each other, from two to twelve carbon atoms, or an inorganic base selected from the group consisting of alkali hydroxides and earth alkali hydroxides and
the catalyst C for urethane formation is selected from the group consisting of organic amines, Brønsted acids, Lewis-acidic organometallic compounds, and organic salts or chelates of metals of groups 4 to 15 of the Periodic System of the Elements.

9. A multi-step process for the preparation of the polyurethane (meth)acrylate U of claim 1, comprising the steps of
a) preparing a prepolymer P1 by reacting, optionally in the presence of an inert solvent S, a mixture of at least one (cyclo)aliphatic diol H2 having a number of carbon atoms of from two to twenty, at least one (cyclo)aliphatic triol H3 having a number of carbon atoms of from three to twenty with a multifunctional isocyanate I to achieve a mass fraction wNCO of isocyanate groups (having a molar mass of 42.017 g/mol) based on the mass of components H2, H3, and I in the reaction mixture, of from 4.5% to 8.5%,
b) adding to the prepolymer P1 of step a), optionally in the presence of an inert solvent S, of at least one component R which is an organic compound having at least one isocyanatereactive group and at least one radically polymerisable olefinically unsaturated group in its molecule, in a mass adequate to lower the mass fraction $w_{NCO}$ of isocyanate groups based on the mass of components H2, H3, I and R in the reaction mixture, to from 0.6% to 3.6%, to make a prepolymer P2 by reaction of the named constituents,
c) adding to the prepolymer P2 of step b), optionally in the presence of an inert solvent S, of an aliphatic hydroxyacid A having at least two carbon atoms, at least one hydroxyl group, and at least one acid group which is selected from the group consisting of a carboxyl group, a sulfonic acid group, or a phosphoric or phosphonic acid group, in a mass adequate to lower the mass fraction $w_{NCO}$ of isocyanate groups based on the mass of components H2, H3, I, R and A in the reaction mixture, to from 0.0% to 0.05%, to make a polymer P3,
d) adding to the product of step c), a basic compound selected from the group consisting of alkali hydroxides, earth alkali hydroxides, ammonia, ammonium hydroxide solutions, organic amines, and organic ammonium hydroxides, each in the form of their aqueous solution or dissolved in other inorganic or organic solvents S', or mixtures of two or more of these basic compounds, to the polymer P3, in a mass adequate to neutralise from 40% to 95% of the acid groups introduced by the aliphatic hydroxyacid A into the polymer P3 made in the reaction step c), wherein the solvent S' employed has to be selected so that it will not interfere with the intended reactions,
e) optionally removing the inert solvent S and/or the solvent S', which may be the same, or may be different, in steps a), b), c), and d) and
f) dispersing the product of step d) or the residue of step e) in water to obtain a mass fraction of solids of from 38% to 48%, and preferably, a dynamic viscosity, measured at 23° C. and a shear rate of 100 s$^{-1}$ in a cone and plate viscosimeter, of from 50 mPa·s to 1000 mPa·s.

10. A multi-step process for the preparation of the polyurethane (meth)acrylate U of claim 8, comprising the steps of
a) preparing a prepolymer P1 by reacting, optionally in the presence of an inert solvent S, a mixture of at least one (cyclo)aliphatic diol H2 having a number of carbon atoms of from two to twenty, at least one (cyclo)aliphatic triol H3 having a number of carbon atoms of from three to twenty with a multifunctional isocyanate I, and in the presence of a catalyst C, to achieve a mass fraction $w_{NCO}$ of isocyanate groups (having a molar mass of 42.017 g/mol) based on the mass of components H2, H3, and I in the reaction mixture, of from 4.5% to 8.50%,
b) adding to the prepolymer P1 of step a), optionally in the presence of an inert solvent S, of at least one component R which is an organic compound having at least one isocyanate-reactive group and at least one radically polymerisable olefinically unsaturated group in its molecule, in a mass adequate to lower the mass fraction $w_{NCO}$ of isocyanate groups based on the mass of components H2, H3, I and R in the reaction mixture, to from 0.6% to 3.6%, to make a prepolymer P2 by reaction of the named constituents,
c) adding to the prepolymer P2 of step b), optionally in the presence of an inert solvent S, of an aliphatic hydroxyacid A having at least two carbon atoms, at least one hydroxyl group, and at least one acid group which is selected from the group consisting of a carboxyl group, a sulfonic acid group, or a phosphoric or phosphonic acid group, in a mass adequate to lower the mass fraction $w_{NCO}$ of isocyanate groups based on the mass of components H2, H3, I, R and A in the reaction mixture, to from 0.0% to 0.05%, to make a polymer P3,
d) adding to the product of step c), a basic compound selected from the group consisting of sodium hydroxide, potassium hydroxide, and lithium hydroxide, each in the form of their aqueous solution or dissolved in other inorganic or organic solvents S', or mixtures of two or more of these basic compounds, to the polymer P3, in a mass adequate to neutralise from 40% to 95% of the acid groups introduced by the aliphatic hydroxyacid A into the polymer P3 made in the reaction step c), wherein the solvent S' employed has to be selected so that it will not interfere with the intended reactions, e) optionally removing the inert solvent S and/or the solvent S', which may be the same, or may be different, in steps a), b), c), and d), by distillation, and f) dispersing the product of step d) or the residue of step e) in water to obtain a mass fraction of solids of from 38% to 48%, and a dynamic viscosity, measured at 23° C. and a shear rate of 100 $s^{-1}$ in a cone and plate viscosimeter, of from 50 mPa·s to 1000 mPa·s.

11. The process of claim 9 wherein a low molar mass (meth)acrylate M having a molar mass of not more than 500 g/mol, and having no isocyanate-reactive group and at least one olefinically unsaturated radically polymerisable group is added during or after any one, or more than one of the process steps a) to e).

12. A method for coating substrates comprising the steps of adding the polyurethane (meth)acrylate U of claim 1 and at least one of water, a photoinitiator, wetting additives, flow additives, light stabilizers, pigments, and fillers, homogenizing the mixture thus obtained, coating the substrate with the homogenized mixture to form a wet layer thickness and subjecting the coated substrate to actinic radiation.

13. A method for coating substrates comprising the steps of adding the polyurethane (meth)acrylate U of claim 8 and at least one of water, a photoinitiator, wetting additives, flow additives, light stabilizers, pigments, and fillers, homogenizing the mixture thus obtained, coating the substrate with the homogenized mixture to form a wet layer thickness of from 10 μm to 150 μm, flash-off at a temperature of from 60° C. to 80° C., for a time of from five minutes to ten minutes, and subjecting the coated substrate to actinic radiation.

* * * * *